(12) United States Patent
Jaskiewicz

(10) Patent No.: US 11,858,339 B2
(45) Date of Patent: Jan. 2, 2024

(54) FUEL FILLER NECK FOR PROVIDING FUEL TO A FUEL TANK AND A METHOD FOR PROVIDING A FUEL ACCESS TO A FUEL TANK

(71) Applicant: VOLVO CONSTRUCTION EQUIPMENT AB, Eskilstuna (SE)

(72) Inventor: Krzysztof Jakub Jaskiewicz, Wroclaw (PL)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 346 days.

(21) Appl. No.: 17/289,091

(22) PCT Filed: Oct. 31, 2018

(86) PCT No.: PCT/EP2018/079810
§ 371 (c)(1),
(2) Date: Apr. 27, 2021

(87) PCT Pub. No.: WO2020/088750
PCT Pub. Date: May 7, 2020

(65) Prior Publication Data
US 2022/0001742 A1    Jan. 6, 2022

(51) Int. Cl.
*B60K 15/035* (2006.01)
*B60K 15/04* (2006.01)
*B60K 15/03* (2006.01)

(52) U.S. Cl.
CPC ........ *B60K 15/03519* (2013.01); *B60K 15/04* (2013.01); *B60K 2015/03236* (2013.01); *B60K 2015/03538* (2013.01)

(58) Field of Classification Search
CPC .. B60K 15/03519; B60K 15/04; B60K 15/03; B60K 2015/03236; B60K 2015/03538; B60K 2015/03335; B60Y 2304/078
(Continued)

(56) References Cited

U.S. PATENT DOCUMENTS 562,267 A * 6/1896 Albin ................ F04B 39/1033
    137/546
6,026,855 A * 2/2000 Jackson ................ F16L 41/16
    285/321

(Continued)

FOREIGN PATENT DOCUMENTS

WO    WO 2018/193252 A1    10/2018

OTHER PUBLICATIONS

International Search Report and Written Opinion of the International Searching Authority, PCT/EP2018/079810, dated Sep. 13, 2019, 8 pages.

*Primary Examiner* — Patrick C Williams
(74) *Attorney, Agent, or Firm* — Sage Patent Group

(57) ABSTRACT

The invention relates to a fuel filler neck for providing fuel to a fuel tank. The fuel filler neck comprises a base tube with an access opening and at least one outlet opening and a flow path from the access opening through an interior of the base tube to the least one outlet opening. Further, the fuel filler neck comprises a transition tube with an access port and an extension tube with at least one outlet port. The transition tube is releasably connected to the extension tube, and a flow passage is provided from the access port through an interior of the transition tube and through an interior of the extension tube to the at least one outlet port. A least a portion of the transition tube is arranged removably and in coverage of the at least one outlet opening within the interior of the base tube.

16 Claims, 9 Drawing Sheets

(58) Field of Classification Search
USPC .......................................................... 137/592
See application file for complete search history.

(56) References Cited

U.S. PATENT DOCUMENTS

| | | | | |
|---|---|---|---|---|
| 6,240,957 B1* | 6/2001 | Hattori | ................... | B60K 15/04 |
| | | | | 137/515 |
| 6,808,209 B2* | 10/2004 | Nakaya | ................... | B60K 15/04 |
| | | | | 285/55 |
| 6,932,100 B2* | 8/2005 | Martin | ................... | F16K 15/033 |
| | | | | 137/315.16 |
| 8,316,881 B2* | 11/2012 | Yamaguchi | ............ | B60K 15/04 |
| | | | | 285/307 |
| 8,403,001 B2* | 3/2013 | Ishizaka | ................. | B60K 15/04 |
| | | | | 137/515 |
| 2005/0067027 A1* | 3/2005 | Kaneko | ................... | B60K 15/04 |
| | | | | 137/592 |
| 2017/0107095 A1 | 4/2017 | Remfry | | |

* cited by examiner

FUEL FILLER NECK FOR PROVIDING FUEL TO A FUEL TANK AND A METHOD FOR PROVIDING A FUEL ACCESS TO A FUEL TANK

CROSS REFERENCE TO RELATED APPLICATIONS

This application is a 35 U.S.C. § 371 national stage application of PCT International Application No. PCT/EP2018/079810 filed on Oct. 31, 2018, the disclosure and content of which is incorporated by reference herein in its entirety.

TECHNICAL FIELD

The invention relates to a fuel filler neck for providing fuel to a fuel tank and a method for providing a fuel access to a fuel tank.

The invention can be applied in heavy-duty vehicles, such as trucks, buses and construction equipment. Although the invention will be described with respect to a working machine in the form of an articulated hauler, the invention is not restricted to this particular vehicle, but may also be used in other vehicles such as other working machines, construction equipment, trucks, and buses.

BACKGROUND

A shut off valve for a refuelling coupling is known from US 2017/0107095 A1. The refuelling coupling according to US 2017/0107095 A1 comprises an annular member, a fitting on the annular member complementary to a pressure refuelling nozzle, a displaceable dry-break member, and a primary sleeve to provide a pressure flow passage for receiving pressurized fuel with peripheral openings at a downstream end. The shut off valve comprises, inter alia, an annular seat on the upstream side of the openings, and an end cap having a float valve with at least one closable outlet arranged to be closed when refuelling is reaching completion to close flow communication from the pressure flow passage to the openings. As an alternative to pressure refuelling, gravity refuelling from a gravity refuelling nozzle is possible through a secondary sleeve slidingly engaged in an inner sleeve of the end cap. However, this is a complex design of a multi-part structure. Further, during pressure refuelling, problems can occur and the pressure refuelling process is not always reliable.

SUMMARY

An object of the invention is to provide a fuel filler neck for providing fuel to a fuel tank and a method for providing a fuel access to a fuel tank, which allow for gravity refuelling as well as for pressure refuelling in a simple, reliable and cost-efficient way.

According to a first aspect of the invention, the object is achieved by a fuel filler neck for providing fuel to a fuel tank according to claim 1. This fuel filler neck for providing fuel to a fuel tank comprises a base tube with an access opening and at least one outlet opening and a flow path from the access opening through an interior of the base tube to the least one outlet opening. The fuel filler neck is characterized in that it comprises a transition tube with an access port and an extension tube with at least one outlet port. The transition tube is releasably connected to the extension tube, and a flow passage is provided from the access port through an interior of the transition tube and through an interior of the extension tube to the at least one outlet port. At least a portion of the transition tube is arranged removably and in coverage of the at least one outlet opening within the interior of the base tube.

The fuel filler neck can be applied for providing fuel to a fuel tank by gravity refuelling as well as by pressure refuelling. Gravity refuelling may also be referred to as standard refuelling and pressure refuelling may also be referred to as fast refuelling. While gravity refuelling is the standard mode for most common fuel stations, pressure refuelling stands for a refuelling mode where fuel is provided under pressure to the fuel tank, wherein special fuel station equipment is required.

The fuel filler neck comprises a base tube and further a transition tube and an extension tube releasably connected to the transition tube. At least a part of the transition tube is removably positioned within the interior of the base tube. When at least said part of the transition tube is removably positioned within the interior of the base tube, the flow passage from the access port of the transition tube through the interior of the transition tube and through the interior of the extension tube to the at least one outlet port of the extension tube is available.

Further, when at least said portion of the transition tube is positioned within the interior of the base tube, the at least one outlet opening of the base tube is covered by the transition tube. Thus, the flow path from the access opening through the interior of the base tube to the at least one outlet opening of the base tube is available when at least said portion of the transition tube is removed from the interior of the base tube.

For pressure refuelling, a nozzle for pressure refuelling can be positioned in the access port of the transition tube and fuel can pass along the flow passage under pressure from the access port through the interior of the transition tube and through the interior of the extension tube to the at least one outlet port of the extension tube. In this situation, the transition tube is releasably connected to the extension tube and at least said part of the transition tube position within the interior of the base tube covers the at least one outlet opening of the base tube, such that the pressurized fuel does not exit through the at least one outlet opening of the base tube. The pressurized fuel rather passes within the transition tube past the at least one outlet opening of the base tube. The pressurized fuel enters the fuel tank via the at least one outlet port of the extension tube, which is releasably connected to the transition tube. Thus, the flow passage for the pressurized fuel extends from the access port of the transition tube through the interior of the transition tube and through the interior of the extension tube to the at least one outlet port of the extension tube. The flow passage for the pressurized fuel is realized inside the base tube for gravity refuelling by positioning at least a portion of the transition tube within the base tube.

For gravity refuelling, the connection between the transition tube and the extension tube is released and the transition tube is removed from the interior of the base tube. A nozzle for gravity refuelling can be positioned in the access opening of the base tube and fuel can pass by gravity along the flow path from the access opening through the interior of the base tube to the at least one outlet opening of the base tube. Thus, in gravity refuelling, the flow path for fuel from the access opening through the interior of the base tube to the at least one outlet opening of the base tube is available and fuel can enter the fuel tank via the at least one outlet opening of the base tube.

Such a fuel filler neck provides an alternative to existing solutions and has the advantage of a simple construction comprising the base tube, the transition tube and the extension tube, as well as the access opening and at least one outlet opening on the base tube and the access port on the transition tube and the at least one outlet port on the extension tube. The design of this fuel filler neck has a low complexity, which can save cost during manufacture and assembly. Further, the simple and low complex design can enhance reliability and increase the lifetime of the fuel filler neck.

The fuel filler neck allows for gravity refuelling as well as for pressure refuelling in a space-saving way. The fuel filler neck as described herein can be applied instead of a standard filler neck. Thus, the need for an additional position and access for a separate pressure filler neck and the resulting additional space requirement can be avoided. This is particular advantageous since space under engine hood and in an engine compartment of a vehicle usually is very limited. Further, a user of a vehicle with a fuel tank with a fuel filler neck as described herein only needs to access one single point for gravity refuelling and for pressure refuelling.

A further advantage is that the fuel filler neck as described herein may be used to retrofit existing fuel tanks.

In addition, the provision of the at least one outlet port on the extension tube allows for the at least one outlet port to be positioned spaced and/or in a different height from the at least one outlet opening on the base tube. For example, the at least one outlet port on the extension tube can be positioned—when the fuel filler neck is operably installed in a fuel tank of a vehicle—at a lower position than the at least one outlet opening of the base tube. A lower position of the at least one outlet port for pressure refuelling can have advantages regarding the process of pressure refuelling and a steady filling of the fuel tank with pressurized fuel. In particular, a lower position of the at least one outlet port for pressure refuelling can help to reduce the forming of foam during pressure refuelling. This is particularly advantageous since it has been found that the formation of foam during pressure refuelling can have negative influences on the reliability of the process of pressure refuelling and may lead, for example, to a suboptimal filling level of a fuel tank and/or a premature termination of the pressure refuelling process. By positioning the at least one outlet port for pressure refuelling in a lower position, the at least one outlet port for pressure refuelling can be closer to a bottom of the fuel tank than the at least one outlet opening for standard refuelling and thus help to reduce the formation of foam.

In general, and if not indicated otherwise, relative terms like "upper", "lower", "above", "below" etc., are understood herein as relating to a fuel filler neck that is operably installed in a fuel tank of a vehicle.

According to one embodiment, two, three or more outlet openings are provided on the base tube. Preferably, the two, three or more outlet openings are provided along the outer periphery of the base tube. In this way, a good distribution of the fuel entering the fuel tank via the two, three or more outlet openings can be realized.

According to a further embodiment a combined axial extension of the transition tube and the extension tube can be larger than an axial extension of the base tube. An axial extension is to be understood herein as an extension along an axial direction of a tube. For example, when a tube is substantially in the form of a hollow cylinder, the axial extension can be measured along a straight line. In case a tube has a curved form, for example, the axial extension can be measured along a curved line.

According to a further embodiment, the least one outlet opening is an opening in a radial direction of the base tube. A radial direction of a tube is to be understood as a direction orthogonal to an axial direction of a tube, which has been described above. An advantage of the least one outlet opening being an opening in a radial direction of the base tube is that a good distribution of the fuel entering the fuel tank via the at least one outlet opening can be realized. Further, a large outlet opening can be realized in the form of a radial opening and high flow volumes of fuel along the flow path out of the at least one outlet opening can be realized.

According to a further embodiment, the extension tube is connected to the base tube. An advantage of the connection of the extension tube to the base tube is enhanced stability of the design. Further, when the extension tube is not removed together with the transition tube, but remains connected to the base tube, the handling of the fuel filler neck, in particular of the removal of the transition tube, can be facilitated.

Preferably, an upper end of the extension tube is connected to a lower end of the base tube. Further preferably, the extension tube protrudes from the base tube in an axial direction. The extension tube and/or the transition tube may extend through an axial aperture of the base tube. With these embodiments, an improvement with regard to the positioning of the at least one outlet port compared to the position of the at least one outlet opening can be realized.

According to a further embodiment, the connection between the extension tube and the transition tube is sealed. A seal can be realized in the form of a sealing element, such as at least one O-ring, for example. Hereby an improvement of the connection between the extension tube and the base tube can be realized.

According to a further embodiment, the base tube comprises an outer shell, an annular cap and a connector tube. Preferably, the annular cap is fuel impermeable.

According to a further embodiment, the base tube comprises an outer shell and an inner filter tube. An advantage of an inner filter tube is that the fuel can be filtered before it enters the fuel tank. An advantage of an outer shell is that a direction of distribution of fuel can be influenced.

According to a further embodiment, the inner filter tube of the base tube protrudes in an axial direction from the outer shell of the base tube. For example, an axial extension of the inner filter tube can be longer than an axial extension of the outer shell. When the upper ends of both the outer shell and an inner filter tube are substantially aligned with the access opening of the base tube, a lower end of the inner filter tube extends beyond a lower end of the outer shell. An advantage of the inner filter tube of the base tube protruding in an axial direction from the outer shell of the base tube is that a simple and low complex solution for influencing direction of fuel flow can be realized. Further, this construction enables a convenient way to realize openings in a radial direction of the base tube in the form of the inner filter tube.

According to a further embodiment, an annular space between the outer shell and the inner filter tube is closed off in an axial direction, preferably by a fuel impermeable annular cap. Hereby a direction of distribution of fuel can be influenced, in particular to enhance fuel distribution out of at least one outlet opening in the form of a radial direction of the base tube.

According to a further embodiment, the at least one outlet opening is in the form of at least one fuel permeable portion of the inner filter tube of the base tube. This is a convenient and reliable way to create the at least one outlet opening, in particular in the form of an opening in a radial direction of the base tube. Further, by providing the at least one outlet opening in the form of at least one fuel permeable portion of the inner filter tube, the fuel can be filtered when passing through the at least one outlet opening.

According to a further embodiment, at least one fuel permeable portion of the inner filter tube of the base tube is in the form of a mesh and/or a screen. Hereby a simple, reliable and cost-efficient solution for a fuel permeable portion is provided.

According to a further embodiment, the extension tube is connected to the inner filter tube of the base tube. This is particularly preferred in case the inner filter tube protrudes in an axial direction from the outer shell of the base tube. By connecting the extension tube to the inner filter tube of the base tube, the provision of at least one outlet opening in a radial direction of the base tube, in particular in the form of at least one fuel permeable portion of the inner filter tube, can be realized.

According to a further embodiment, the inner filter tube comprises at least one reinforced portion. Hereby an improvement of stability, in particular of the inner filter tube, can be achieved. Since the inner filter tube can comprise at least one fuel permeable portion, at least one reinforced portion adding structural strength is preferred. Preferably, the at least one reinforced portion is fuel impermeable. A fuel impermeable material can be particularly suitable for providing additional strength. Optionally, the reinforced portion may strengthen the inner filter tube in such a way that at a certain length, the wall is full. Preferably, the inner filter tube's function is not transferring loads. The inner filter tube may have a regular structure, in particular if it is sufficiently strong.

According to a further embodiment, the at least one reinforced portion extends in an axial direction of the inner filter tube. An extension in an axial direction is to be understood that a main extension of the reinforced portion is positioned axially. Thus, the reinforced portion preferably has an extension in a circumferential direction and/or in a radial direction of the inner filter tube, which is smaller than an extension in an axial direction of the inner filter tube. Hereby a particularly good improvement of stability can be achieved.

According to a further embodiment, the inner filter tube comprises several reinforced portions spaced apart from another in a circumferential direction. Hereby an improvement of stability can be evenly distributed along the periphery of the inner filter tube.

According to a further embodiment, the access opening comprises a closure, the closure being arranged at the transition tube. Preferably, when at least said portion of the transition tube is positioned within the interior of the base tube, the closure arranged at the transition tube closes the access opening of the base tube. This has the advantage that the access opening is closed when the transition tube is positioned within the interior of the base tube and that the access opening is available when the transition tube is removed from in the interior of the base tube.

According to a further embodiment, the access port comprises a closing cap, the closing cap being arranged at the transition tube. The closing cap preferably serves to close the access port when the fuel filler neck is not used for refuelling. An advantage of the closing cap is that the fuel filler neck, in particular its access port, can be closed, against debris and/or moisture and/or spillage, for example.

According to a further embodiment, an inlet valve and/or an intermediate valve can be positioned at the transition tube, e.g. on the exterior of the transition tube or in the interior of the transition tube. The inlet valve can be screwed to the top of the transition tube, for example. Preferably, the intermediate valve comprises an intermediate valve body and an intermediate valve seat, wherein the intermediate valve body is biased against the intermediate valve seat by intermediate valve biasing element, e.g. in the form of a spring. Preferably, inlet valve can have a corresponding identical or similar design.

According to a further embodiment, the intermediate valve can be configured as a valve opening at a certain pressure limit, which preferably is realized by pressurized fuel during pressure refuelling, such that the pressurized fuel will act to open the intermediate valve. Further preferably, the intermediate valve can comprise an intermediate valve pin, which can be coupled to the inlet valve via an intermediate valve connector, such that when inlet valve is opened, e.g. by a pressure refuelling nozzle, also the intermediate valve is opened.

The provision of an inlet valve and/or an intermediate valve has the advantage that the flow passage for pressurized fuel can be closed, against debris and/or moisture and/or spillage, for example, as long as no pressurized refuelling takes place.

According to a further embodiment, the extension tube comprises a bottom valve. A bottom valve can be preferred to control the provision of pressurized fuel to a surrounding of the fuel filler neck, in particular to a fuel tank. Hereby an improvement of pressurized fuel provision can be achieved.

According to a further embodiment, the fuel filler neck comprises a breather valve which is connected to the bottom valve via a breather line. The breather valve can serve to control a changing, in particular rising, fill level of a fuel tank and to provide a signal to the fuel filler neck, for example to the bottom valve of the fuel filler neck, when a maximum fill level is reached. Thereby the pressure refuelling process can be terminated in a controlled manner.

According to a second aspect of the invention, the object is achieved by a method for providing a fuel access to a fuel tank. This method for providing a fuel access to a fuel tank comprises the step of providing a flow path from an access opening to least one outlet opening through an interior of a base tube. The method is characterized by the step of arranging at least a portion of a transition tube removably and in coverage of the least one outlet opening within the interior of the base tube and releasably connecting the transition tube to an extension tube to provide a flow passage from an access port at the transition tube to least one outlet port at the extension tube.

According to one embodiment, the method for providing a fuel access to a fuel tank comprises the step of removing at least said portion of the transition tube from the interior of the base tube.

As to the advantages, preferred embodiments and details of the method for providing a fuel access to a fuel tank, reference is made to the corresponding aspects and embodiments of the fuel filler neck described above.

The invention also relates to a fuel tank comprising a fuel filler neck as described herein.

The invention also relates to a vehicle comprising a fuel filler neck as described herein or comprising a fuel tank as described herein.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
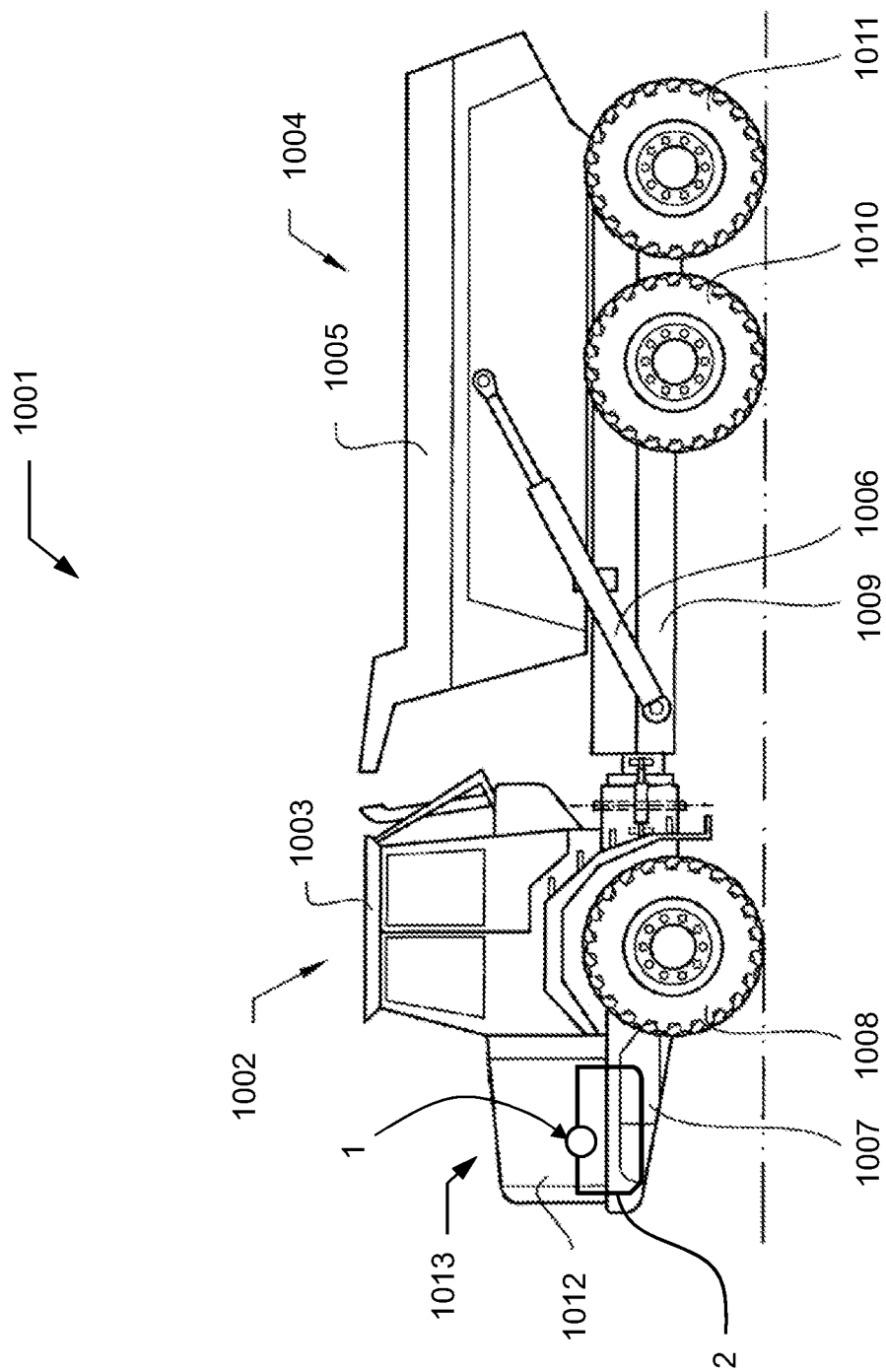
FIG. 1 is a side view of an articulated hauler with a fuel tank with an exemplary embodiment of a fuel filler neck as described herein.

FIG. 1 is an illustration of a working machine 1001 in the form of an articulated hauler having a front section 1002 with a cab 1003 for a driver and a rear section 1004 with a container 1005 for receiving a load. The container 1005 is preferably pivotally connected to the rear section 1004 and tiltable by means of a pair of tilting cylinders 1006, for example hydraulic cylinders. The front section 1002 has a front frame 1007 and a pair of wheels 1008 suspended from the front frame 1007. The rear section 1004 has a rear frame 1009 and two pairs of wheels 1010, 1011 suspended from the rear frame 1009. The front section 1002 has a hood 1013 covering an engine compartment 1012. A fuel tank 2 with a fuel filler neck 1 as described herein is provided. The fuel filler neck 1 can be applied for providing fuel to a fuel tank 2 by gravity refuelling as well as by pressure refuelling.

Figure 2:
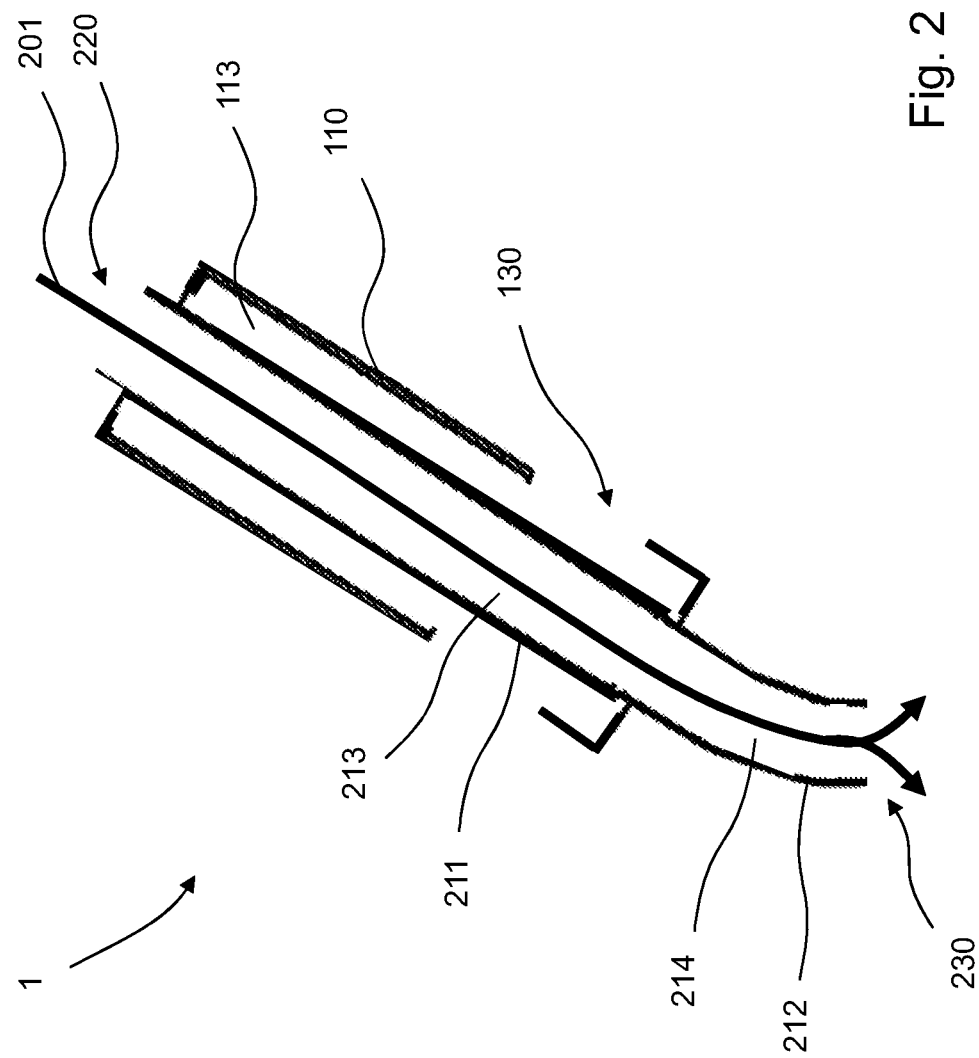
FIG. 2 is a cross-sectional view of an exemplary embodiment of a fuel filler neck as described herein.
Figure 3:
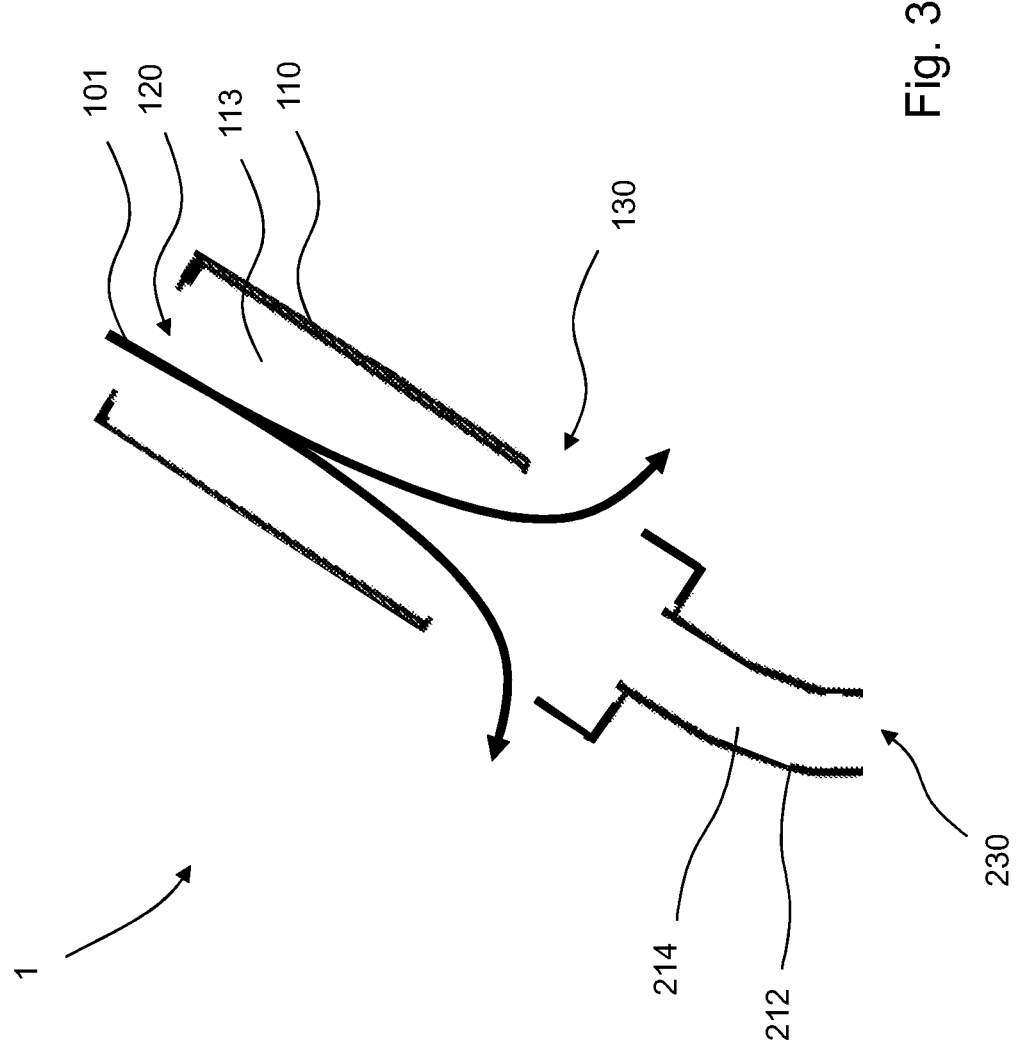
FIG. 3 is a cross-sectional view of the exemplary embodiment of a fuel filler neck according to FIG. 3 with the transition tube removed.

FIGS. 2 and 3 show an exemplary embodiment of a fuel filler neck 1 as described herein.

FIGS. 4 through 8 show further exemplary embodiments of a fuel filler neck 1 as described herein.

Identical elements or elements with substantially identical function are provided with identical reference signs. Identical or similar principles apply for the different embodiments of the fuel filler neck 1 unless described differently.

Figure 9:
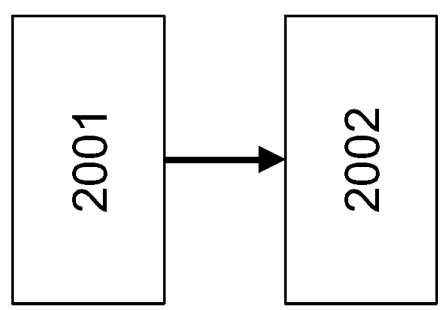
FIG. 9 is a flow chart of an exemplary embodiment of a method for providing a fuel access to a fuel tank as described herein.

FIG. 9 is a flow chart of an exemplary embodiment of a method for providing a fuel access to a fuel tank 2 as described herein.

The exemplary embodiment of a fuel filler neck 1 according to FIGS. 2 and 3 as well as according to FIGS. 4 through 8 comprises a base tube 110 with an access opening 120 and at least one outlet opening 130 in a radial direction of the base tube 110. Further, the fuel filler neck 1 comprises a transition tube 211 with an access port 220 and an extension tube 212 with at least one outlet port 230. The transition tube 211 is releasably connected to the extension tube 212. At least a portion of the transition tube 211 is arranged removably and in coverage of the at least one outlet opening 130 within the interior 113 of the base tube 110. The extension tube 212 is connected to the base tube 110, in particular a lower end of the base tube. When releasably connected to the extension tube 212, the transition tube 211 covers the at least one outlet opening 130 of the base tube 110.

As can be seen in FIG. 2, for pressure refuelling a flow passage 201 is provided from the access port 220 through an interior 213 of the transition tube 211 and through an interior 214 of the extension tube 212 to the at least one outlet port 230.

For pressure refuelling, a nozzle for pressure refuelling can be positioned in the access port 220 of the transition tube 211 and fuel can pass along the flow passage 201 under pressure from the access port 220 through the interior 213 of the transition tube 211 and through the interior 214 of the extension tube 212 to the at least one outlet port 230 of the extension tube 212.

The pressurized fuel does not exit through the at least one outlet opening 130 of the base tube 110, since the transition tube 211, when releasably connected to the extension tube 212, covers the at least one outlet opening 130 of the base tube 100. The pressurized fuel rather passes within the transition tube 211 past the at least one outlet opening 130 of the base tube 110. The pressurized fuel enters a fuel tank via the at least one outlet port 230 of the extension tube 212, which is releasably connected to the transition tube 211. Thus, the flow passage 201 for the pressurized fuel extends from the access port 220 of the transition tube 211 through the interior 213 of the transition tube 211 and through the interior 214 of the extension tube 212 to the at least one outlet port 230 of the extension tube 212.

Further, as can be seen from the figures, a combined axial extension of the transition tube 211 and the extension tube 212 is larger than an axial extension of the base tube 110. While the base tube 110 and the extension tube 211 are substantially in the form of a hollow cylinder and have a straight axial extension, the extension tube 212 is curved with a curved axial extension.

Figure 4:
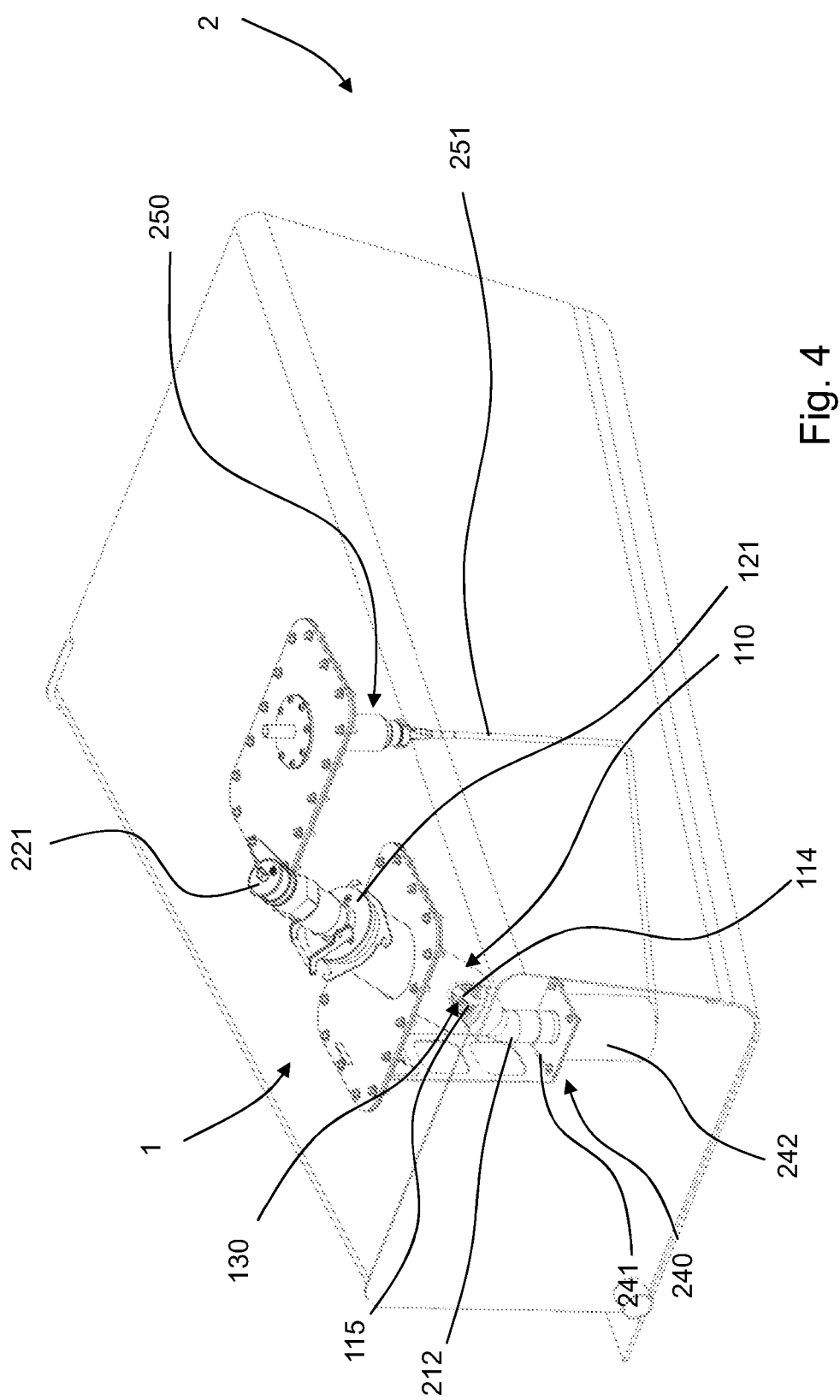
FIG. 4 is a three-dimensional view of a fuel tank with a further exemplary embodiment of a fuel filler neck as described herein.

In the examples depicted, the at least one outlet opening 130 is in the form of openings in a radial direction of the base tube 110. In FIG. 4, for example, outlet opening 130 is in the form of a dome shaped recess. However, alternatives, for example in the form of openings in an axial direction of the base tube, are possible.

In particular, the inner filter tube 112 is responsible for blocking contaminants from entering into the tank. Preferably, the main supporting structure, e.g. in the form of a frame, is, among others, base tube 110.

For gravity refuelling, the connection between the transition tube 211 and the extension tube 212 is released and the transition tube 211 is removed from the interior 113 of the base tube 110 and a flow path 101 extends from the access opening 120 through an interior 113 of the base tube 110 to the least one outlet opening 130, as can be seen, for example, in FIG. 3. A nozzle for gravity refuelling can be positioned in the access opening 120 of the base tube 110 and fuel can pass by gravity along the flow path 101 from the access opening 120 through the interior 113 of the base tube 110 to the at least one outlet opening 130 of the base tube 110. Thus, in gravity refuelling, the fuel can enter the fuel tank via the at least one outlet opening 130 of the base tube 110.

As can be seen from FIGS. 2 and 3, the at least one outlet opening 130 is located above the at least one outlet port 230. The lower end of the base tube 110 is closed off in an axial direction, for example by a fuel impermeable annular cap.

In the embodiment shown in FIG. 3, in gravity refuelling, fuel can also enter the fuel tank via the at least one outlet port 230.

Figure 5:
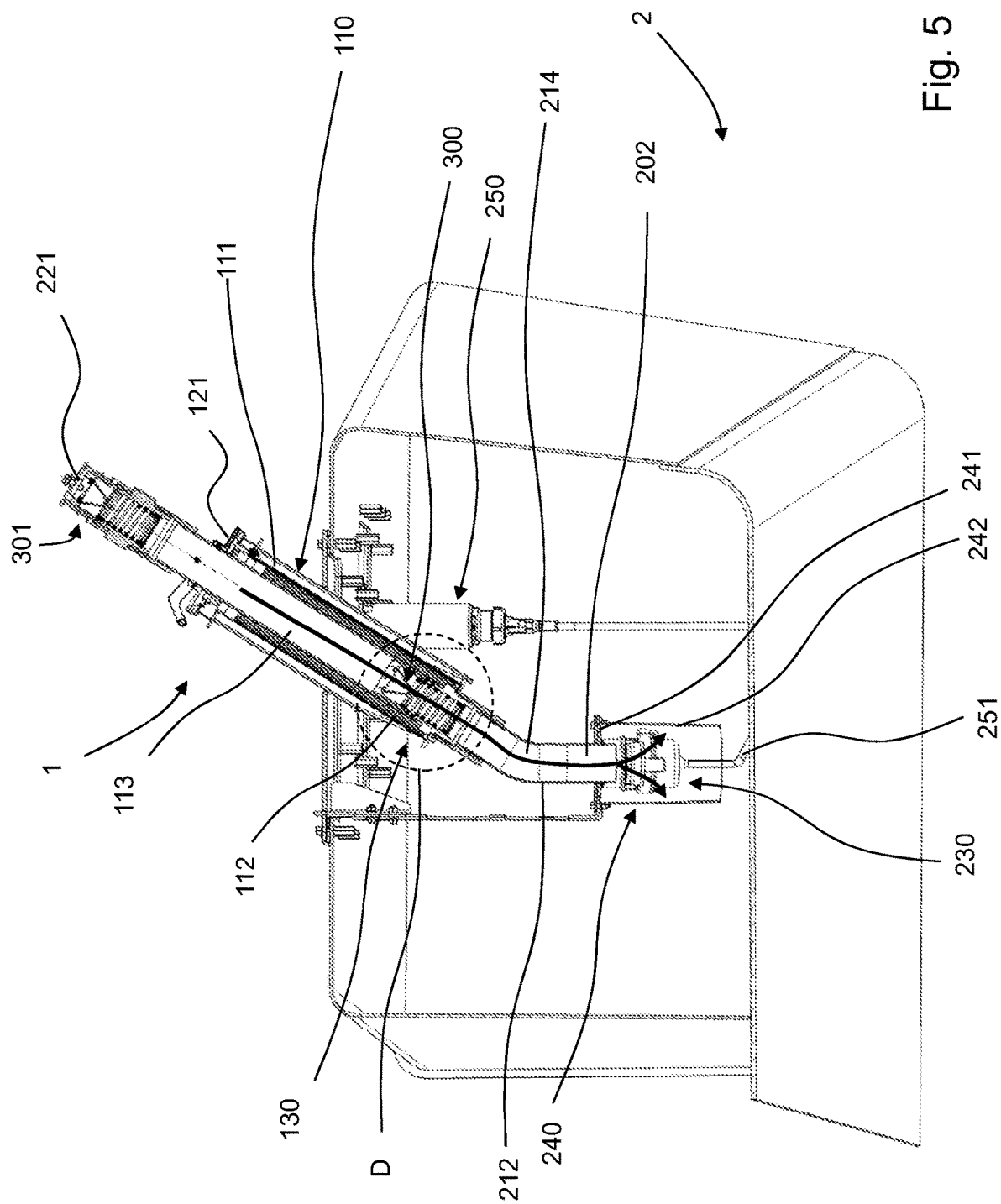
FIG. 5 is a cross-sectional view of the fuel tank according to FIG. 4.
Figure 7:
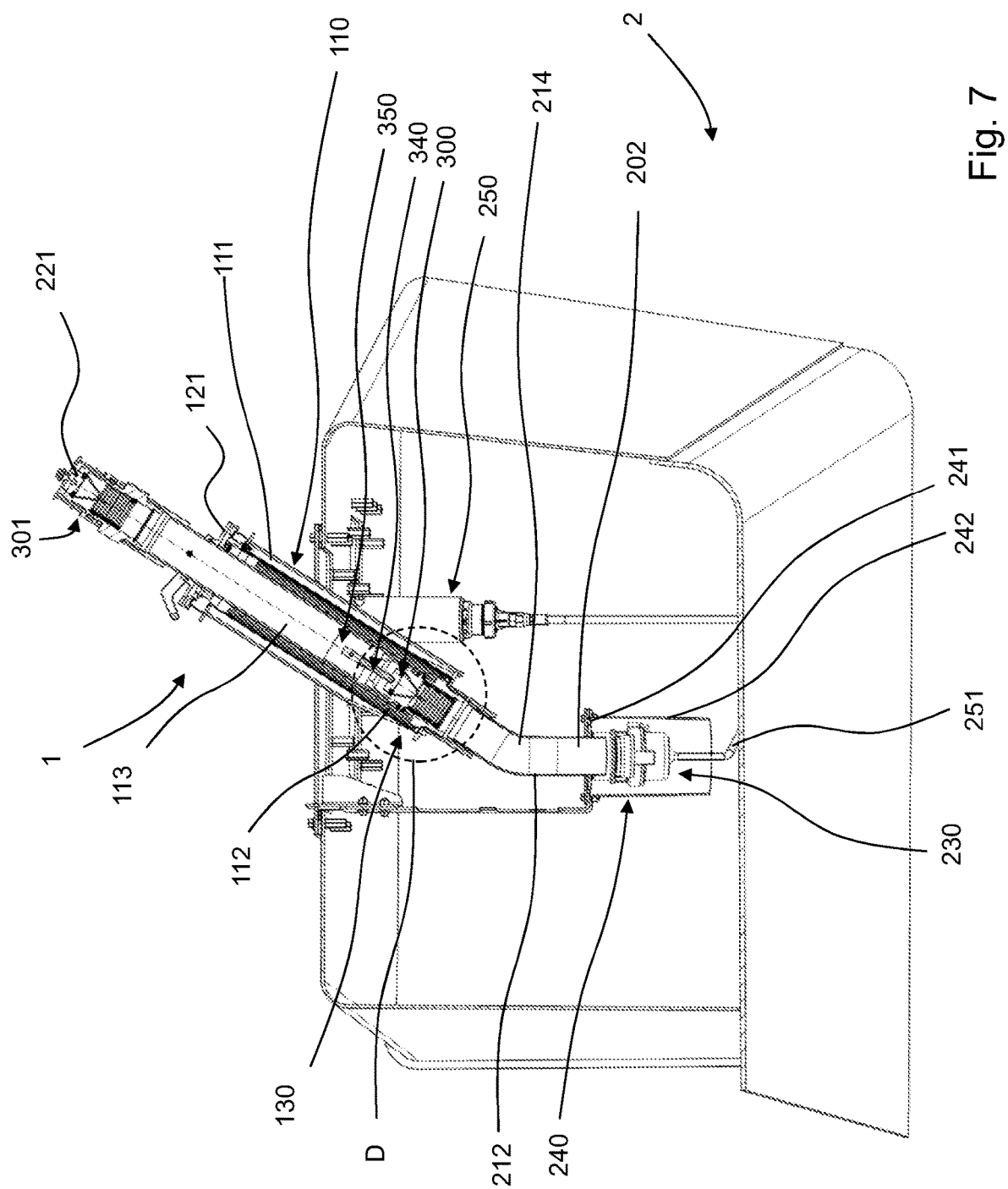
FIG. 7 is a cross-sectional view of the fuel tank according to FIG. 4 with an alternative embodiment of the intermediate valve opening system.

In the embodiments shown in FIGS. 5, and 7, the at least one outlet port 230 is provided on bottom valve 240. The bottom valve 240 can be configured to allow only pressurized fuel to exit through the at least one outlet port 230.

FIGS. 4 through 8 show the fuel filler neck 1 in a situation where no refuelling takes place and the access port 220 is closed by a closing cap 221 arranged at the transition tube 211. The closing cap 221 can be in a position closing the access port 220 and in a position allowing access to the access port 220. The closing cap 221 can be fully removable from the transition tube 211 or can be attached to the transition tube 211 via a loss protection element also when the closing cap 221 does not close the access port 220.

FIGS. 4, 5, and 7 further show a closure 121 of the access opening 120 provided on the transition tube 211. When at least a portion of the transition tube 211 is positioned within the interior 113 of the base tube 110, the closure 121 closes the access opening 120 of the base tube 110. Thus, as long as the transition tube 211 is positioned within the interior 113 of the base tube 100, the access opening 120 of the base tube 110 is not available.

When the closing cap 221 is removed, access port 220 is available for pressure refuelling and a flow passage is available from the access port 220 through an interior 213 of the transition tube 211 and through an interior 214 of the extension tube 212 to the at least one outlet port 230 of a bottom valve 240.

FIGS. 5 through 8 show examples of an inlet valve 301 and an intermediate valve 300 positioned in the interior 213 of the transition tube 211. The intermediate valve 300 comprises an intermediate valve body 310 and an intermediate valve base 320 with an intermediate valve seat 321, wherein the intermediate valve body 310 is biased against the intermediate valve seat 321 by intermediate valve biasing element 330 in the form of a spring. Inlet valve 301 can have a corresponding identical or similar design.

Figure 6:
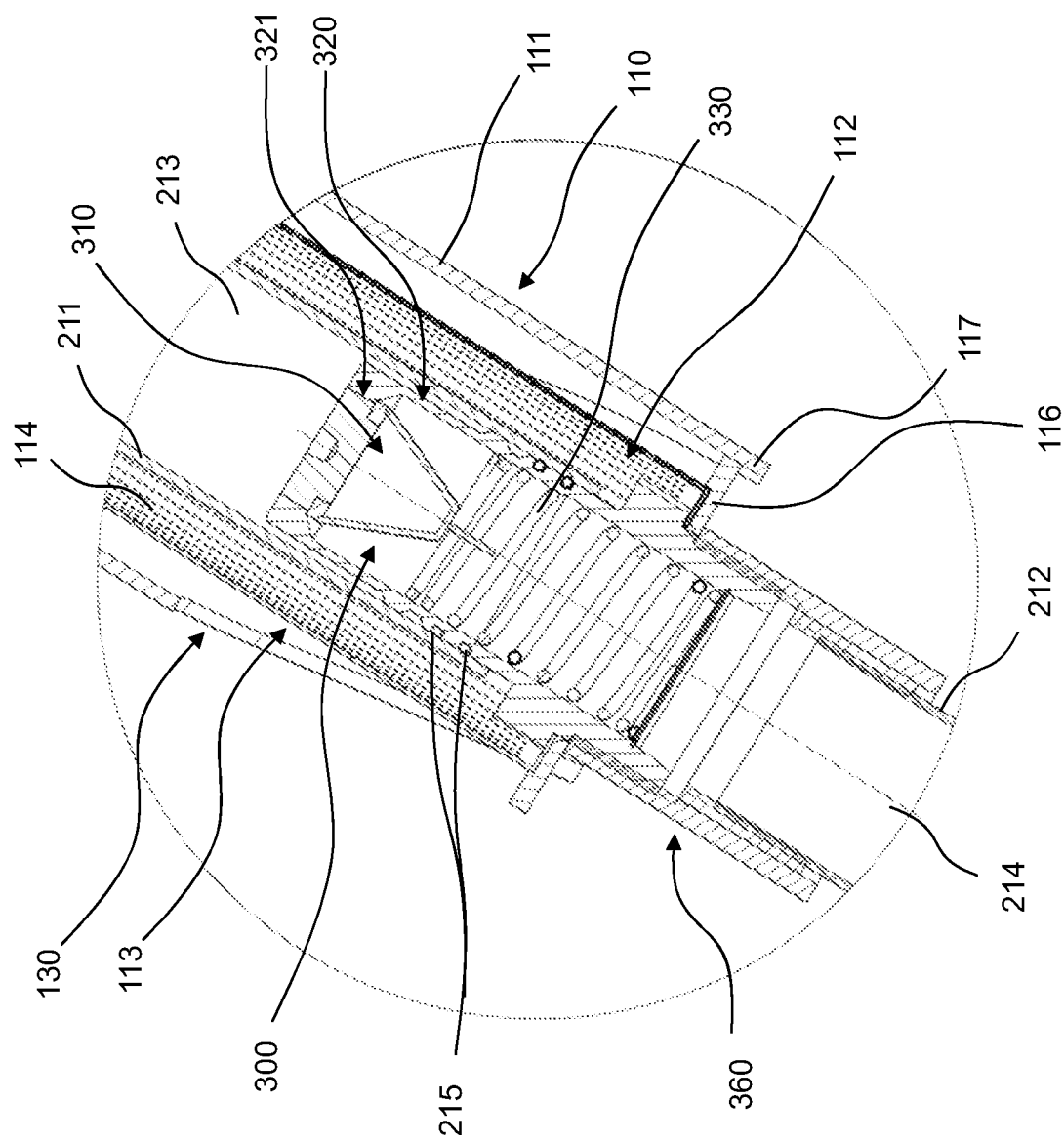
FIG. 6 is an enlarged detail of a part of the cross-sectional view according to FIG. 5.
Figure 8:
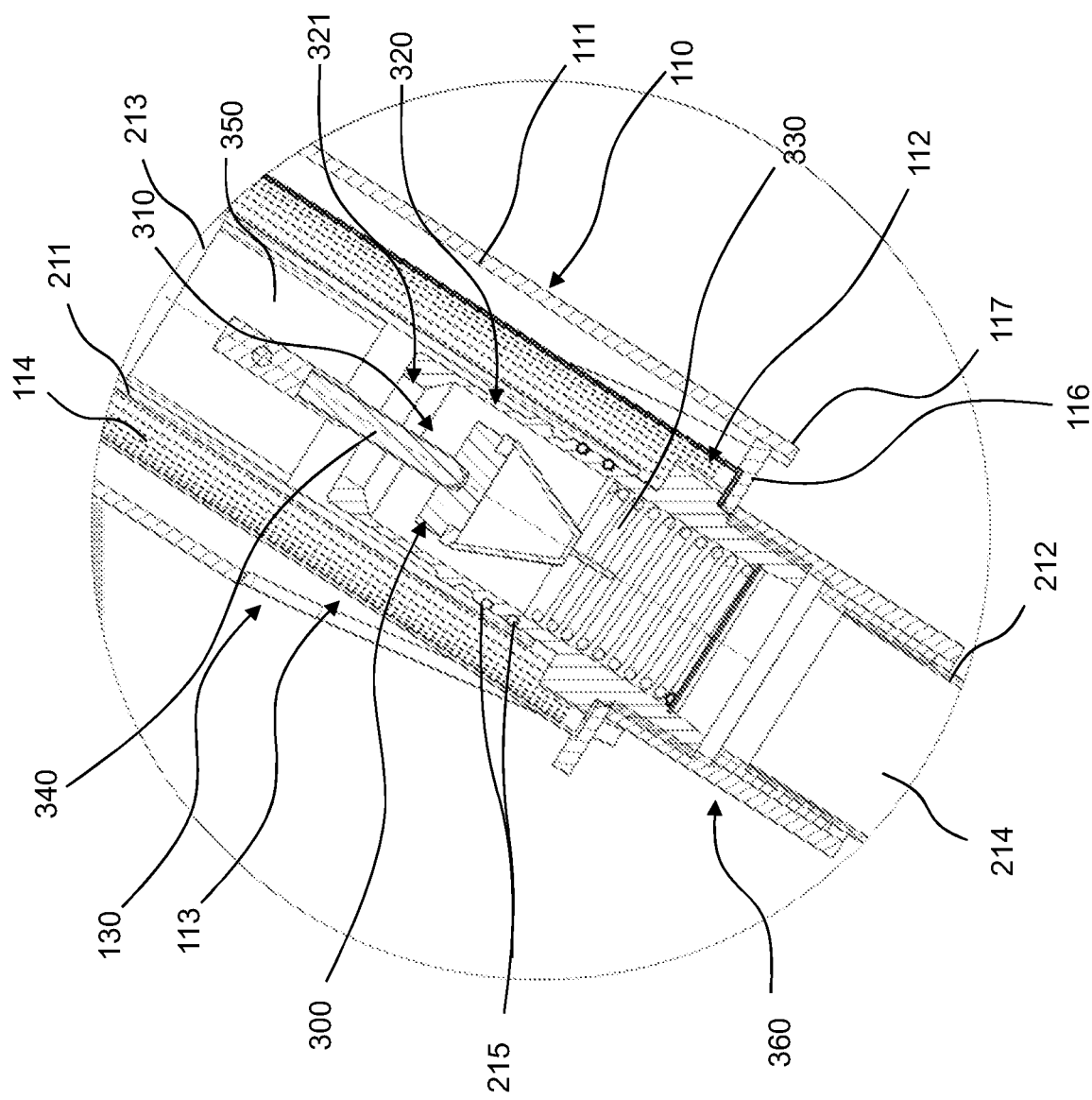
FIG. 8 is an enlarged detail of a part of the cross-sectional view according to FIG. 7.

Intermediate valve 300 in the embodiment of FIGS. 5 and 6 can be configured as a valve opening at a certain pressure limit, which preferably is realized by pressurized fuel during pressure refuelling. Thus, the pressurized fuel will act to open intermediate valve 300 in the embodiment of FIGS. 5 and 6. In the embodiment of FIGS. 7 and 8, intermediate valve 300 can comprise an intermediate valve pin 340, which can be coupled to the inlet valve 301 via an intermediate valve joint 350. Thus, when inlet valve 301 is opened, e.g. by a pressure refuelling nozzle, also intermediate valve 300 is opened.

The bottom valve 240 comprises an optional mounting element in the form of mounting plate 241 for mounting the extension tube within the fuel tank and adding further stability, in particular for pressure refuelling. Mounting elements can also be in the form of bars or struts or anchorings, etc. In the embodiment depicted in FIGS. 4 and 5, a cylindrical shield 242 is provided protruding downwardly from mounting plate 241 surrounding the outlet port 230 and bottom valve 240 in order to reduce or prevent foam building caused by stirring movement of the fuel upon entering the fuel tank 2.

Further, the bottom valve 240 is connected to a breather valve 250 via a breather line 251. By the breather valve 250, during the refuelling, the pressure is set with respect to the surrounding pressure, which can be necessary due to temperature changes and as resulting volume changes. The bottom valve 240, the breather valve 250 and the breather line 251 can be realized in the form of known bottom valves, breather valves and the breather lines for pressure refuelling.

For gravity refuelling, the transition tube 211 is removed from the interior 113 of the base tube 110 and a flow path 101 extends from the access opening 120 through an interior 113 of the base tube 110 to the least one outlet opening 130, as can be seen in FIG. 3.

Further, as can be seen from FIGS. 4 through 8, the at least one outlet opening 130 is located above the at least one outlet port 230.

According to the examples of FIGS. 4 through 8, the base tube 110 comprises and outer shell 111 and an annular cap 116. An inner filter tube 112 is provided, which protrudes in an axial direction from the outer shell 111 of the base tube 110. The at least one outlet opening 130 is in the form of at least one fuel permeable portion 114 of the inner filter tube 112 of the base tube 110, for example a mesh or screen. For example, the permeable portion 114 of the inner filter tube 112 of the base tube 110 can comprise a plurality of apertures, which can be arranged in a repeating or random pattern and which can be identical or different in size. The material of the inner filter tube can comprise materials such as plastic, metal, non-wovens, filter media, or other material suitable for filtration.

The inner filter tube 112 comprises several reinforced portions 115 spaced apart from another in a circumferential direction, as can been in FIG. 4. The inner filter tube 112 is provided in order to filter the fuel. But it is preferred that it is not damaged during its cleaning and service of the fast filling system. Preferably, the pattern of plurality of apertures, such as holes, in the inner filter tube 112 can be random, while maintaining the required strength.

Further, as can be seen from FIGS. 6 and 8, the releasable connection between the transition tube 211 and valve base 320 can be in the form of a slide-on connection and is sealed. In the depicted examples, the seal is realized in the form of sealing elements 215, such as O-rings, for example. Preferably, an upper end of the extension tube 212 comprises a diameter large enough to accommodate a lower end of the transition tube 211 therein. For example, the releasable connection between the transition tube 211 and valve base 320 can be in the form of a slide-on connection, a snap-fit connection, a bayonet connection or the like. As can be seen from FIGS. 6 and 8, the upper end of the extension tube 212 can comprise a connector tube 360 connecting the upper end of the extension tube 212 to the lower end of the transition tube and the inner filter tube 112 of the base tube 110.

As further can be seen from FIGS. 6 and 8, an annular space between the outer shell 111 and the inner filter tube 112 is closed off in an axial direction by an annular cap 116 surrounded by an annular protrusion 117. In particular, the annular cap 116 is connected to the outer shell 111 and serves as a support element. Preferably, the annular cap can be fuel impermeable. As can be seen in FIG. 11, in particular, the extension tube 212 extends through an axial aperture 118 of the base tube 110, in particular of the inner filter tube 112 of the base tube 110.

In particular, the extension tube 212 is connected to the transition tube 211 by means of the intermediate valve 300 and a connector tube 360. Preferably, it is part of the refuelling system for pressurized fuel. The inner filter tube 112 preferably is a part of the gravity refuelling system. Further preferably, the extension tube 212 and the inner filter tube 112 are not connected with each other directly, e.g. by means of welding, etc.

The extension tube 212 is connected to the inner filter tube 112 of the base tube 110, possibly via the connector tube 360. The connection of the extension tube 212 to the base tube 110 can be a releasable connection, such as a slide-on connection, a snap-fit connection, a bayonet connection or the like, or a non-releasable connection, such as an adhesive connection, a welded connection or a one-piece or integral design of the base tube with the extension tube. Preferably, the connection is stable and inseparable, but it does not have to be absolutely tight. For example, there can be an 8 bar pressure inside the system, additionally the machine vibrates. Therefore, the connection preferably is secured against automatic disconnection or disconnection under the influence of working pressure. Connections such as welding, screwing, bayonet connection are preferred.

The embodiments of the fuel filler neck provide an alternative design, which is simple, reliable and cost-efficient. Further, the design allows for gravity refuelling as well as for pressure refuelling in a space-saving way. In addition, the fuel filler neck is suitable for retrofitting existing fuel tanks.

FIG. 8 depicts a method for providing a fuel access to a fuel tank 2 comprising the step 2001 of providing a flow path 101 from an access opening 120 to least one outlet opening 130 through an interior 113 of a base tube 110. The method further comprises the step 2002 of arranging at least a portion of a transition tube 211 removably and in coverage of the least one outlet opening 130 within the interior 113 of the base tube 110 and releasably connecting the transition tube 211 to an extension tube 212 to provide a flow passage 201 from an access port 220 at the transition tube 211 to least one outlet port 230 at the extension tube 212. Preferably, the method for providing a fuel access to a fuel tank 2 further comprises the step of removing at least said portion of the transition tube 211 from the interior 113 of the base tube 110.

It is to be understood that the present invention is not limited to the embodiments described above and illustrated in the drawings; rather, the skilled person will recognize that many changes and modifications may be made within the scope of the appended claims.

The invention claimed is:

1. A fuel filler neck for providing fuel to a fuel tank, comprising:
   a base tube with an access opening and at least one outlet opening and a flow path from the access opening through an interior of the base tube to the least one outlet opening,
   wherein the fuel filler neck comprises a transition tube with an access port and an extension tube with at least one outlet port,
   wherein the transition tube is releasably connected to the extension tube, and a flow passage is provided from the access port through an interior of the transition tube and through an interior of the extension tube to the at least one outlet port,
   wherein at least a portion of the transition tube is arranged removably and in coverage of the at least one outlet opening within the interior of the base tube, and
   wherein the least one outlet opening is an opening in a radial direction of the base tube.

2. A fuel filler neck according to claim 1, wherein the extension tube is connected to the base tube.

3. A fuel filler neck according to claim 1, wherein the base tube comprises an outer shell, an annular cap, an inner filter tube, and a connector tube.

4. A fuel filler neck according to claim 3, wherein the inner filter tube of the base tube protrudes in an axial direction from the outer shell of the base tube.

5. A fuel filler neck according to claim 3, wherein the at least one outlet opening is in the form of at least one fuel permeable portion of the inner filter tube of the base tube.

6. A fuel filler neck according to claim 3, wherein the extension tube is connected to the inner filter tube of the base tube.

7. A fuel filler neck according to claim 3, wherein the inner filter tube comprises at least one reinforced portion.

8. A fuel filler neck according to claim 7, wherein the inner filter tube comprises several reinforced portions spaced apart from another in a circumferential direction.

9. A fuel filler neck according to claim 1, wherein the access opening comprises a closure, the closure being arranged at the transition tube.

10. A fuel filler neck according to claim 1, wherein the access port comprises a closing cap, the closing cap being arranged at the transition tube.

11. A fuel filler neck according to claim 1, wherein the extension tube comprises a bottom valve.

12. A fuel filler neck according to claim 11, wherein the fuel filler neck comprises a breather valve which is connected to the bottom valve via a breather line.

13. A fuel tank comprising a fuel filler neck according to claim 1.

14. A vehicle comprising a fuel filler neck according to claim 1.

15. A vehicle comprising a fuel tank according to claim 13.

16. A method for providing a fuel access to a fuel tank, the method comprising:
   providing a flow path from an access opening to least one outlet opening through an interior of a base tube, wherein the least one outlet opening is an opening in a radial direction of the base tube; and
   arranging at least a portion of a transition tube removably and in coverage of the least one outlet opening within the interior of the base tube and releasably connecting the transition tube to an extension tube to provide a flow passage from an access port at the transition tube to least one outlet port at the extension tube.

* * * * *